(12) United States Patent
Dun et al.

(10) Patent No.: US 10,955,949 B2
(45) Date of Patent: Mar. 23, 2021

(54) DISPLAY PANEL HAVING TWO TYPES OF TOUCH ELECTRODES AND DISPLAY DEVICE THEREOF

(71) Applicant: Shanghai AVIC OPTO Electronics Co., Ltd., Shanghai (CN)

(72) Inventors: Dongliang Dun, Shanghai (CN); Huijun Jin, Shanghai (CN)

(73) Assignee: Shanghai AVIC OPTO Electronics Co., Ltd., Shanghai (CN)

( * ) Notice: Subject to any disclaimer, the term of this patent is extended or adjusted under 35 U.S.C. 154(b) by 41 days.

(21) Appl. No.: 16/233,714

(22) Filed: Dec. 27, 2018

(65) Prior Publication Data

US 2019/0294282 A1 Sep. 26, 2019

(30) Foreign Application Priority Data

Mar. 23, 2018 (CN) .......................... 201810245908.7

(51) Int. Cl.
*G06F 3/041* (2006.01)
*G09G 3/36* (2006.01)

(52) U.S. Cl.
CPC .......... *G06F 3/0412* (2013.01); *G06F 3/0416* (2013.01); *G09G 3/3648* (2013.01)

(58) Field of Classification Search
CPC .................................................... G06F 3/0412
USPC ...................................................... 345/173
See application file for complete search history.

(56) References Cited

U.S. PATENT DOCUMENTS

| 2016/0026291 A1* | 1/2016 | Zhao ....................... G06F 3/044 345/174 |
| 2018/0120993 A1* | 5/2018 | Kurasawa ............ G06K 9/0002 |
| 2019/0042038 A1* | 2/2019 | Lee ......................... G06F 3/047 |

FOREIGN PATENT DOCUMENTS

| CN | 105094427 A | 11/2015 |
| CN | 107272966 A | 10/2017 |
| CN | 107656651 A | 2/2018 |

OTHER PUBLICATIONS

Chinese Office Action for application No. 201810245908.7; dated Jul. 16, 2020.

* cited by examiner

*Primary Examiner* — Long D Pham
(74) *Attorney, Agent, or Firm* — von Briesen & Roper, s.c.

(57) ABSTRACT

Provided are a display panel and a display device. The display panel includes a base substrate, at least one first type touch electrode block and at least one second type touch electrode block in a first layer and insulated with each other, touch signal lines in a second layer, and an insulation layer between the first layer and the second layer. The first type touch electrode block is connected to one or more touch signal lines via multiple first through holes running through the insulation layer, and the second type touch electrode block is connected to one or more touch signal lines via multiple second through holes running through the insulation layer. In a column containing the first type touch electrode block, the second distance of at least one second type touch electrode block is smaller than the first distance of the first type touch electrode block.

21 Claims, 14 Drawing Sheets

13

13

13

DISPLAY PANEL HAVING TWO TYPES OF TOUCH ELECTRODES AND DISPLAY DEVICE THEREOF

CROSS-REFERENCE TO RELATED APPLICATIONS

This application claims priority to a Chinese patent application No. 201810245908.7 filed on Mar. 23, 2018, the disclosure of which is incorporated herein by reference in its entirety.

TECHNICAL FIELD

The present disclosure relates to display technologies, and, in particular, relates to a display panel and a display device.

BACKGROUND

With the development of display technologies, the demands of users become more and more diversified. The traditional rectangular display panel has been unable to meet the diverse displaying and using demands of users. Therefore, the free form display panel (such as a screen with a notch) is becoming an important development trend of display technologies.

The shape of the free form display panel in related arts is not a traditional rectangle, the free form display panel has a special-shaped edge such as a rounded corner, a cutting angle, a notch and the like. The free form display panel includes a first type touch electrode block and a second type touch electrode block. The second type touch electrode block is arranged close to the normal edge of the free form display panel, and usually has the traditional rectangle shape. The first type touch electrode block is arranged at the special-shaped edge, the shape of the first type touch electrode block is not the traditional rectangle, but adjusted according to the special-shaped edge, so the area of the first type touch electrode block is often smaller than the area of the second type touch electrode block. In order to reduce a connection resistance between the touch electrode block and a touch signal line and to improve the connecting stability between the touch electrode block and the touch signal line, the touch electrode block and the touch signal line are connected by via connections formed in an insulation layer between the touch electrode block and the touch signal line. At present, in the free form display panel, the area of the first type touch electrode block is often smaller than the area of the second type touch electrode block, so the allowed number of the through holes on the first type touch electrode block is smaller than that of the second type touch electrode block, the connection resistance between the first type touch electrode block and the touch signal line is greater, and the touch and control performance of the free form display panel around the special-shaped edge is pretty poor.

SUMMARY

The present disclosure provides a display panel and a display device so as to improve the touch control performance of the free form display panel.

In a first aspect, the present disclosure provides a display panel.

The display panel includes a base substrate, at least one first type touch electrode block and at least one second type touch electrode block which are formed in a first layer and insulated with each other, a plurality of scanning lines and a plurality of date lines, a plurality of touch signal lines formed in a second layer, and an insulation layer between the first layer and the second layer.

The least one first type touch electrode block is different from the least one second type touch electrode block in shape, the shape of each of the first type touch electrode block is not a rectangle, the at least one first type touch electrode block and the at least one second type touch electrode block are arranged together in an array.

Each of the at least one first type touch electrode block is connected to one or more of the plurality of touch signal lines by a plurality of first through holes running through the insulation layer.

Each of the at least one second type touch electrode block is connected to one or more of the plurality of touch signal lines by a plurality of second through holes running through the insulation layer.

The plurality of scanning lines intersect the plurality of date lines. A column direction of the array is parallel to an extending direction of the plurality of data lines, and a row direction of the array is parallel to an extending direction of the plurality of scanning lines.

The minimum one of distances between an edge of the display panel closest to the first type touch electrode block and the plurality of first through holes connected to the first type touch electrode block is a first distance of the first type touch electrode block. The minimum one of distances between an edge of the display panel closest to the second type touch electrode block and the plurality of second through holes connected to the second type touch electrode block is a second distance of the second type touch electrode block.

In a column of the array containing one of the at least one first type touch electrode block, the second distance of at least one second type touch electrode block in the column is smaller than the first distance of the first type touch electrode block.

In a second aspect, the present disclosure further provides a display device, and the display device includes any display panel provided in embodiments of the present disclosure.

According to the present disclosure, in column containing the first type touch electrode block, the second distance of at least one second type touch electrode block is smaller than the first distance of the first type touch electrode block. The present disclosure solves the problem of the free form display panel in related arts that the allowed number of through holes arranged on the first type touch electrode block is smaller than that of the second type touch electrode block, the connection resistance between the first type touch electrode block and the touch signal line is large, and the touch performance of the display panel around the special-shaped edge is poor. The present disclosure improves the touch and control performance of the display panel.

DETAILED DESCRIPTION

Figure 1:
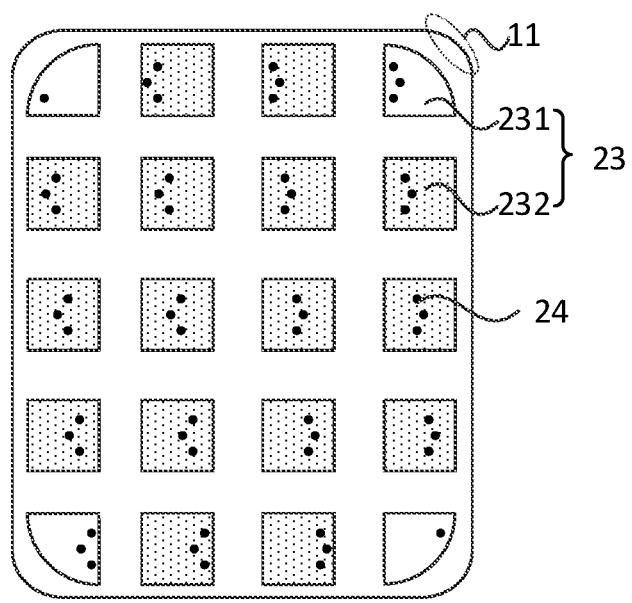
FIG. 1 is a diagram showing a plane structure of a display panel according to related arts.

The present disclosure is further detailed below in combination with the accompanying drawings and embodiments. It should be understood that, the specific embodiments described herein are merely used for explaining the present disclosure rather than limiting the present disclosure. In addition, it should be noted that in order to facilitate the description, merely a part of structures related to the present disclosure rather than the whole structure is illustrated in the drawings.

As described above, the shape of the conventional display panel is rectangular, while the shape of the free form display panel in related arts may be not rectangular. The free form display panel often has a special-shaped edge such as a rounded corner, a cut angle, a notch and the like. The first type touch electrode block arranged closed to the special-shaped edge is not a rectangle, which is adjusted according to the special-shaped edge. As a result, the region on the first type touch electrode block which is suitable for arranging the through holes is decreased.

FIG. 1 is a diagram showing a plane structure of a display panel according to related arts. As shown in FIG. 1, the shape of the display panel 10 is not rectangular, and has rounded corners 11. The display panel 10 includes a plurality of touch electrode blocks 23 arranged in an array, and the plurality of touch electrode blocks 23 are used for realizing a touch control function. The touch electrode blocks 23 include first type touch electrode blocks 231 and second type touch electrode blocks 232. The first type touch electrode block 231 is located close to the rounded corner 11 and is in a sector shape. The second type touch electrode block 232 is not close to the rounded corner 11 and is in a rectangular shape. The touch electrode block 23 is connected to one or more touch signal lines (not shown in FIG. 1) by through holes (also referred to vias or via connections) 24 running through an insulation layer between a layer where the touch electrode block 23 is located and a layer where the touch signal line is located. The through holes 24 are used for realizing the electrical connection between the touch electrode block 23 and the touch signal line.

As shown in FIG. 1, in the free form display panel, the area of the first type touch electrode block 231 is apparently smaller than the area of the second type touch electrode block 232. In order to adapt to the shape of the first type touch electrode block 231, the number of through holes by which the first type touch electrode block 231 is connected to the touch signal line is smaller than the number of through holes by which the second type touch electrode block 232 is connected to the touch signal line. Taking the display panel in FIG. 1 as an example, the number of through holes corresponding to the first type touch electrode block 231 at the intersection of row 1 and column 1 and the number of through holes corresponding to the first type touch electrode block 231 at the intersection of row 5 and column 4 are 1, both of them are smaller than the number of through holes corresponding to the second type touch electrode block 232. The decrease in the number of through holes will increase the connection resistance between the touch signal line and the first touch the electrode block 231, and affects the touch control performance around the rounded corner 11, thereby affecting the touch control performance of the whole display panel.

Figure 2:
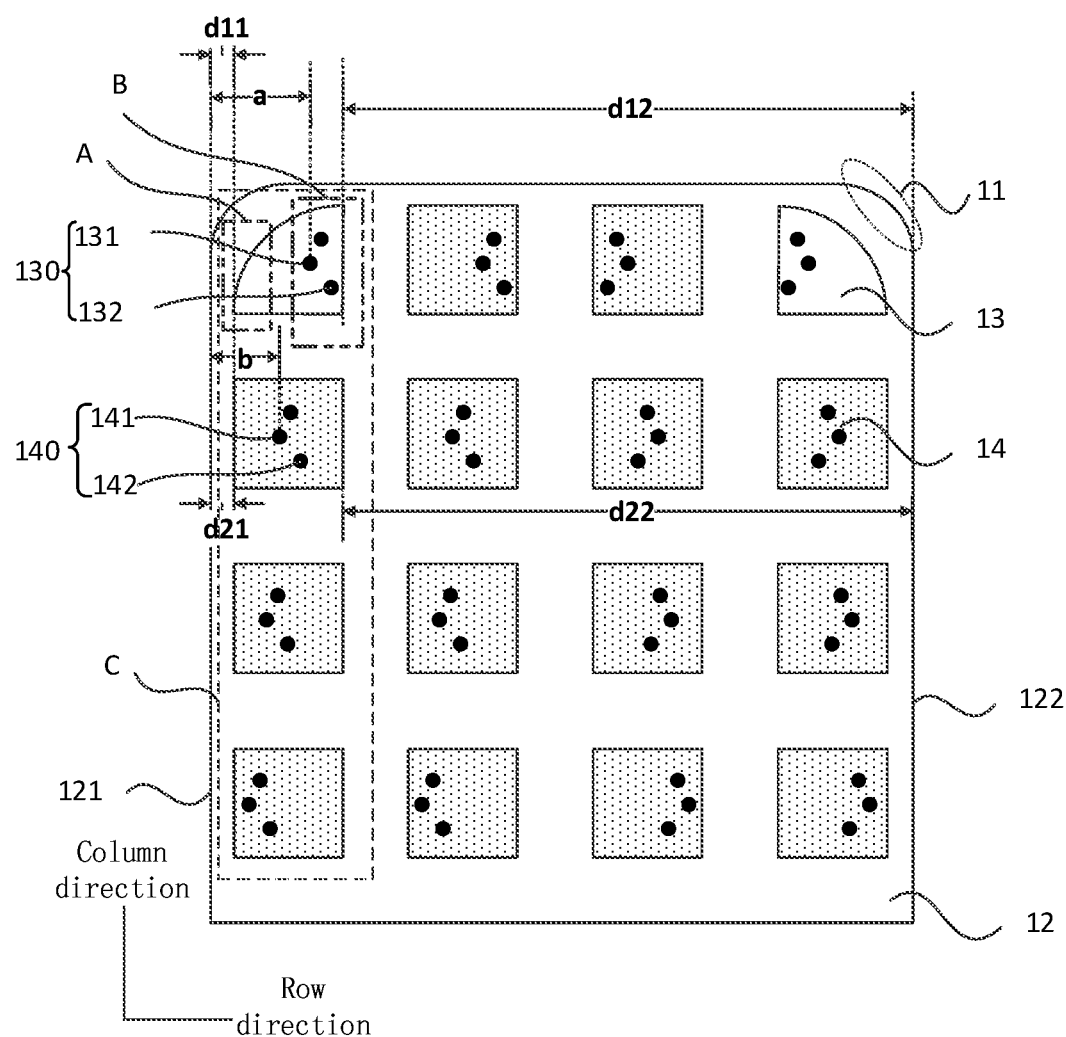
FIG. 2 is a structure diagram of a display panel according to an embodiment of the present disclosure.
Figure 3A:
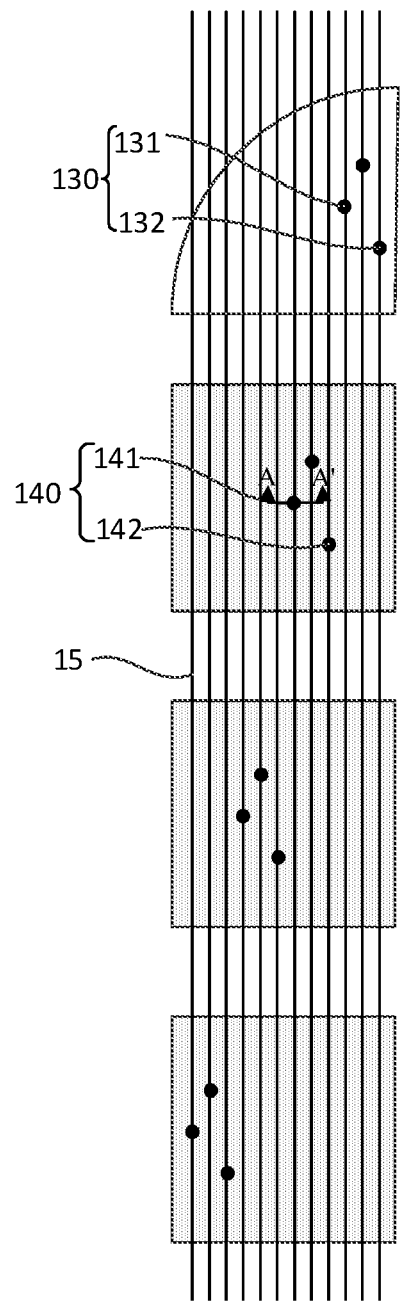
FIG. 3A is a diagram showing an enlarged structure of a region C in FIG. 2.
Figure 3B:
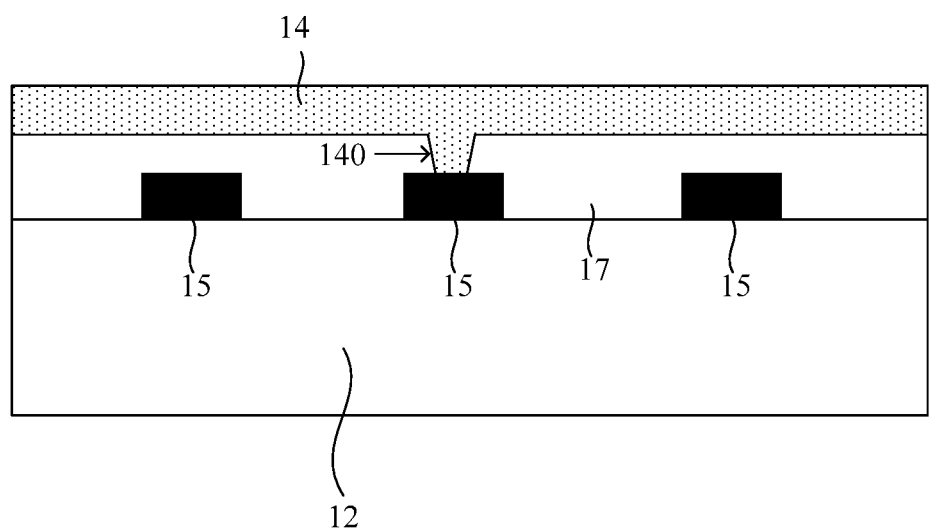
FIG. 3B is a partial cross sectional view of the display panel taken along the line AA' in FIG. 3A.

FIG. 2 is a structure diagram of a display panel according to an embodiment of the present disclosure, FIG. 3A is a diagram showing an enlarged structure of a region C in FIG. 2. FIG. 3B is a partial cross sectional view of the display panel taken along the line AA' in FIG. 3A. As shown in FIG. 2, FIG. 3A and FIG. 3B, the display panel 10 is a display panel with rounded corners. The display panel 10 includes a base substrate 12, at least one first type touch electrode block 13 and at least one second type touch electrode block 14 which are formed in a first layer on the base substrate 12 and insulated with each other, a plurality of touch signal lines 15 which are formed in a second layer, and an insulation layer 17 between the first layer and the second layer. A shape of the first type touch electrode block 13 is different from a shape of the second type touch electrode block 14, and the shape of the first type touch electrode block 13 is not rectangular. For example, the first type touch electrode block 13 has an arc-shaped edge. The at least one first type touch electrode block 13 and the at least one second type touch electrode block 14 are arranged together in an array. The first type touch electrode block 13 is electrically connected to one or more touch signal lines 15 by a plurality of first through holes 130 running through the insulation layer 17 through hole. In the embodiment shown in FIG. 2, FIG. 3A and FIG. 3B, the first type touch electrode block 13 is electrically connected to 3 touch signal lines 15. The second type touch electrode block 14 is electrically connected to one or more touch signal lines 15 by a plurality of second through holes 140 running through the insulation layer 17 through hole. In the embodiment shown in FIG. 2, FIG. 3A and FIG. 3B, the second type touch electrode block 14 is electrically connected to 3 touch signal lines 15. A plurality of scanning lines (not shown in FIG. 2) and a plurality of date lines (not shown in FIG. 2 and FIG. 3A) are further arranged on the base substrate 12, the scanning lines intersect the date lines. A column direction of the array is parallel to an extending direction of the data line, and a row direction of the array is parallel to an extending direction of the scanning line.

The minimum one of distances between the plurality of first through holes 130 corresponding to the first type touch electrode block 13 and the edge of the display panel 10 closest to the first type touch electrode block 13 is a first distance of the first type touch electrode block 13. As shown in FIG. 2, the display panel 10 includes a left edge 121 and a right edge 122, and both of the left edge 121 and the right edge 122 are parallel to the column direction. The first distance is illustrated by taking the first type touch electrode block 13 at the intersection of row 1 and column 1 in FIG. 2 as an example. For this first type touch electrode block 13, the distance between the first type touch electrode block 13 and the left edge 121 is d11, and the distance between the first type touch electrode block 13 and the right edge 122 is d12. Since d11<d12, and the left edge 121 is the edge of the display panel 10 closest to the first type touch electrode block 13. The first type touch electrode block 13 is electrically connected to three touch signal lines 15 via three first through holes 130, the distance between the left-most first through hole 131 and the left edge 121 (that is, the edge of the display panel 10 closest to the first type touch electrode block 13) is the minimum distance, and the distance between the right-most first through hole 132 and the left edge 121 is the maximum distance. Therefore, the distance a between the left-most first through hole 131 and the left edge 121 is the first distance of the first type touch electrode block 13.

Similarly, the minimum one of the distances between the plurality of second through holes 140 corresponding to the second type touch electrode block 14 and the edge of the display panel 10 closest to the second type touch electrode block 14 is a second distance of the second type touch electrode block 14. Similarly, as shown in FIG. 2, the second distance is illustrated by taking the second type touch electrode block 14 at the intersection of row 2 and column 1 as an example. For this second type touch electrode block 14, the distance between the second type touch electrode block 14 and the left edge 121 is d12, and the distance between the second type touch electrode block 14 and the right edge 122 is d12. Since d21<d22, the left edge 121 is the edge of the display panel 10 closest to the second type touch electrode block 14. The second type touch electrode block 14 is electrically connected to three touch signal lines 15 via three second through holes 140. The distance between the left-most second through hole 141 and the left edge 121 (that is, the edge of the display panel 10 closest to the second type touch electrode block 14) is the minimum distance, and the right-most distance between the second through hole 142 and the left edge 121 is the maximum distance. Therefore, the distance b between the left-most second through hole 141 and the left edge 121 is the second distance of the second type touch electrode block 14.

In a column including the first type touch electrode block 13, the second distance b of at least one second type touch electrode block 14 in this column is smaller than the first distance a of the first type touch electrode block 13. Exemplarily, as shown in FIG. 2, b<a, that is, the second distance b of the second type touch electrode block 14 at the intersection of row 2 and column 1 is smaller than the first distance a of the first type touch electrode block 13 at the intersection of row 1 and column 1.

As shown in FIG. 2, in order to adapt to the special-shaped edge (namely the rounded corner 11) on the top left corner of the display panel, the shape and area of the first type touch electrode block 13 are adaptively adjusted, causing that regions of the first type touch electrode block 13 do not have a same length in the in the column direction. In FIG. 2, the length of region A along the column direction is smaller than the length of region B along the column direction. According to the technical solution provided by the present disclosure, in the column including the first type touch electrode block 13, the second distance of at least one second type touch electrode block 14 in this column is smaller than the first distance of the first type touch electrode block, essentially, the technical solution is to arrange as many the first through holes 130 as possible in region B and to avoid arranging the first through holes 130 in region A of the first type touch electrode block 13. Since the length of the region B in the column direction is larger than that of the region A, a larger number of the first through holes 130 can be arranged on the region B than the region A, and accordingly, the number of the first through holes 130 corresponding to the first type touch electrode block is equal to or approaches to the number of the second through holes 140 corresponding to the second type touch electrode block. With such an arrangement, the connection resistance between the first type touch electrode block 13 and the touch signal line 15 is equal to or approaches to the connection resistance between the second type touch electrode block 14 and the touch signal line 15, and the touch control performance near the special-shaped edge of the display panel is improved, thereby improving the overall touch control performance of the display panels 10.

In addition, it should be noted that, the larger the number of the first through holes 130 used for connecting the first type touch electrode block 13 and the touch signal lines 15, the lower the probability of causing a disconnection between the first type touch electrode block 13 and its corresponding touch signal lines 15, and the higher the tolerance ability of the display panel.

On the basis of the foregoing technical solutions, in an alternative embodiment, at least one first type touch electrode block 13 and at least one second type touch electrode block 14 are reused as common electrodes. In the actual operation process, the operation of the display panel 10 includes a touch stage and a display stage. In the touch stage, the first type touch electrode block 13 and the second type touch electrode block 14 transmit touch control information. In the display stage, the first type touch electrode block 13, which is reused as the common electrode, and the second type touch electrode block 14, which is reused as the common electrode, transmit the common voltage signal.

Figure 4:
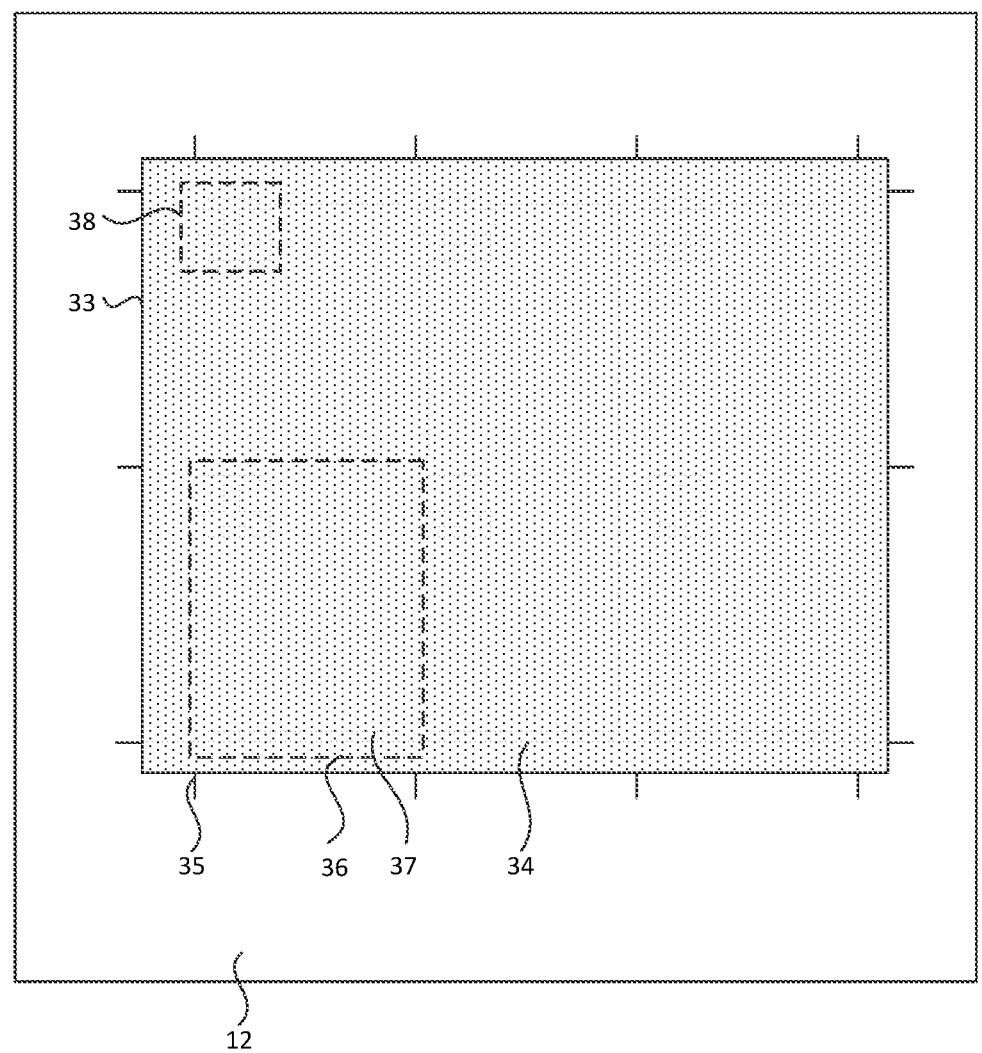
FIG. 4 is a diagram showing a partial structure of another display panel according to an embodiment of the present disclosure.

FIG. 4 is a diagram showing a partial structure of another display panel according to an embodiment of the present disclosure. As shown in FIG. 4, the display panel includes a base substrate 12, a plurality of scanning lines 34 and a plurality of date lines 35 formed on the base substrate 12. The plurality of scanning lines 34 intersect the plurality of date lines 35, and the plurality of scanning lines 34 and the plurality of date lines 35 define a plurality of pixel units 36 each including a pixel electrode 37 and a thin film transistor 38. A gate electrode of the film transistor 38 is connected to the scanning line 34, a signal input end of the thin film transistor 38 is connected with the data line 35, and a signal output end of the thin film transistor 38 is connected with the pixel electrode 37. The display panel further includes a touch electrode block 33. The vertical projection of at least a part of the scanning lines 34 on the base substrate 12 and the vertical projection of at least a part of the data lines 35 on the base substrate 12 are within the vertical projection of the touch electrode block 33 on the base substrate 12. It should be noted that, the touch electrode block 33 may be the first type touch electrode block or the second type touch electrode block.

In the display stage, the scanning lines 34 receive a scanning voltage one by one. When the scanning voltage is provided to one scanning line 34, the thin film transistors 38 which are connected to the one scanning line 34 are controlled to be turned on, such that the data signals on the data lines 35 can be transmitted to the pixel electrodes 37. A common voltage signal is provided to the touch electrode block 33 to form an electric field between the touch electrode block 33 and the pixel electrode 37, so as to control the liquid crystal corresponding to the pixel unit 36 to rotate.

In the actual operation process, in the display stage and in a transition stage in which the display panel 10 is switched from the touch stage to the display stage, if the difference between the connection resistance between the first type touch electrode block 13 and the touch signal line and the connection resistance between the second type touch electrode block 14 and the touch signal line is large, and the RC coupling between the first type touch electrode block 13 and the data line 35 (the scanning line 34) is different from the RC coupling between the second type touch electrode block and the data line 35 (the scanning line 34). As a result, the voltage difference between the first type touch electrode block 13 reused as the common electrode and the pixel electrode 37 is difference from the voltage difference between the second type touch electrode block 14 reused as the common electrode and the pixel electrode 37, that is, the electric field intensity of the electric field formed by the first type touch electrode block 13 reused as the common electrode and the pixel electrode 37 is difference from the electric field intensity of the electric field formed by the second type touch electrode block 14 reused as the common electrode and the pixel electrode 37. In this way, when the same common voltage is provided for the first type touch electrode block 13 and the second type touch electrode block 14, a rotation angle of a liquid crystal molecule of the pixel unit 36 corresponding to the first type touch electrode block 13 is different from a rotation angle of a liquid crystal molecule of the pixel unit 36 corresponding to the second type touch electrode block 14, and the luminescence of the pixel unit 36 corresponding to the first type touch electrode block 13 is different from that of the pixel unit 36 corresponding to the second type touch electrode block 14. The pixel unit 36, corresponding to the first type touch electrode block 13, refer to the pixel unit 36 the vertical projection of which on the base substrate 12 is located in in the vertical projection of the first type touch electrode block 13 on the base substrate 12. Similarly, the pixel unit 36, corresponding to the second type touch electrode block 14, refer to the pixel unit 36 the vertical projection of which on the base substrate 12 is located in in the vertical projection of the second type touch electrode block 14 on the base substrate 12.

It can be seen that, with the technical solution provided by the present disclosure, the connection resistance between the first type touch electrode block 13 and the touch signal line is equal to or approaches to the connection resistance between the second type touch electrode block 14 and the touch signal line, which makes the voltage difference between the first type touch electrode block 13 and the pixel electrode be equal to or approach to the voltage difference between the second type touch electrode block 14 and the pixel electrode, thereby improving the overall display effect of the display panel 10.

As shown in FIG. 2, FIG. 3A and FIG. 3B, on the basis of the foregoing technical solutions, for the display panel 10 in an alternative embodiment, the numbers of the first through holes 130 corresponding to the first type touch electrode blocks 13 are the same, and the numbers of the second through holes 140 corresponding to the second type touch electrode blocks 14 are the same. In an exemplary embodiment, the number of the first through holes 130 corresponding to one first type touch electrode block 13 is equal to the number of the second through holes 140 corresponding to one second type touch electrode block 14, such that the connection resistance between the touch signal line and the first type touch electrode block 13 is equal to the connection resistance between the touch signal line and the second type touch electrode block 14, thereby further improving the touch control performance and display effect of the display panel 10.

Figure 5A:
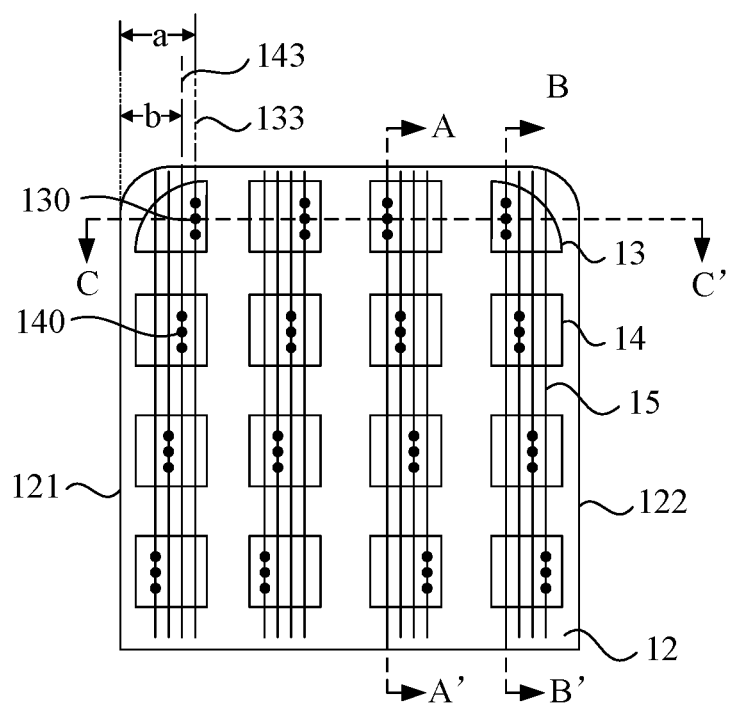
FIG. 5A is a structure diagram of another display panel according to an embodiment of the present disclosure.
Figure 5B:
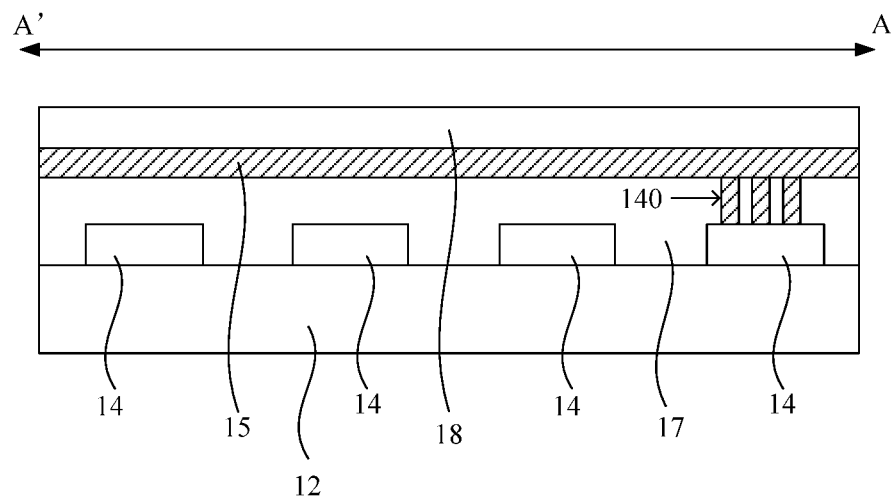
FIG. 5B is a cross sectional view of the display panel taken along the line AA' in FIG. 5A.
Figure 5C:
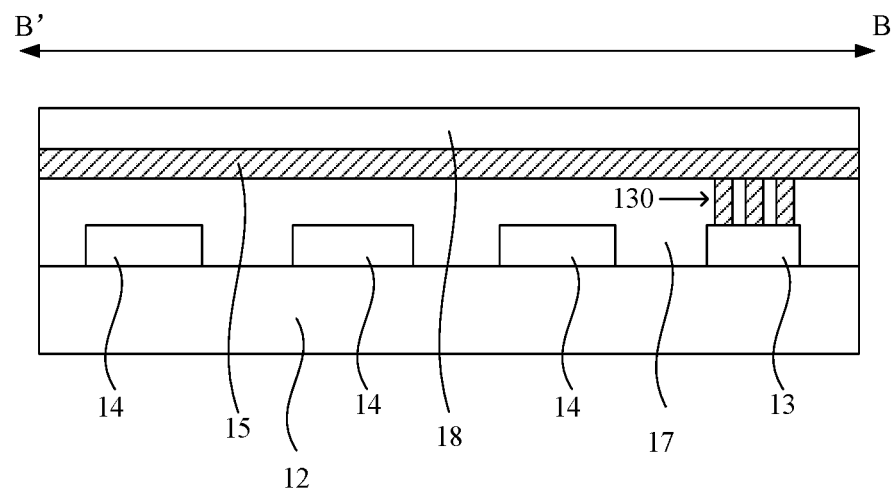
FIG. 5C is a cross sectional view of the display panel taken along the line BB' in FIG. 5A.
Figure 5D:
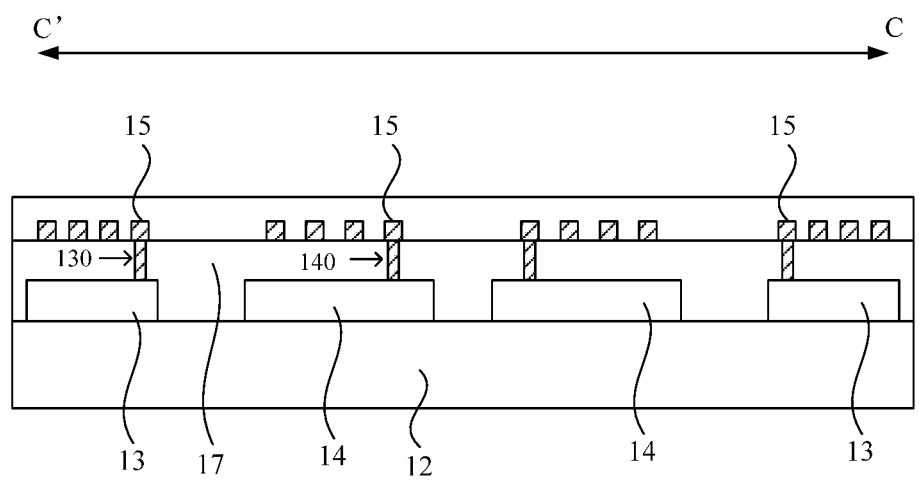
FIG. 5D is a cross sectional view of the display panel taken along the line CC' in FIG. 5A.

FIG. 5A is a structure diagram of another display panel according to an embodiment of the present disclosure. FIG. 5B is a cross sectional view of the display panel taken along the line AA' in FIG. 5A. FIG. 5C is a cross sectional view of the display panel taken along the line BB' in FIG. 5A. FIG. 5D is a cross sectional view of the display panel taken along the line CC' in FIG. 5A. As shown in FIG. 5A to FIG. 5D, each first type touch electrode block 13 is electrically connected to a respective one touch signal line 15 via three first through holes 130 running through the insulation layer 17, and each second type touch electrode block 14 is electrically connected to a respective one touch signal line 15 via three second through holes 140 running through the insulation layer 17. The first layer where the first type touch electrode blocks 13 and the second type touch electrode blocks 14 are located is below the second layer where the touch signal lines 15 are located. The touch signal lines 15 are covered by a protecting layer 18. The touch signal lines 15 are parallel to each other and parallel to the column direction of the array.

As shown in FIG. 5A, on the basis of the foregoing technical solutions, each of the first type touch electrode blocks 13 corresponds to a first straight line 133, and the plurality of first through holes 130 corresponding to the same first type touch electrode block 13 are located on the first straight line 133, and the first straight line 133 is parallel to the column direction of the array.

It should be understand that if there are too many intersections between the touch signal lines 15 in the display panel, the touch signal lines 15 may be short-circuited or broken, and the difficulty of manufacturing the display panel 10 is increased. Therefore, in order to decrease the difficulty of manufacturing the display panels 10, in the display area, the extension direction of the touch signal line 15 is the same as the extension direction of the date line, that is, the extension direction of the touch signal line 15 is parallel to the column direction of the array. If the first straight line 133 is not parallel to the column direction of the array, or, the first through holes 130 corresponding to the same first type touch electrode block 13 are not aligned in a line as shown in FIG. 3A, it is necessary to arranged one touch signal line 15 for each of the first through holes 130. It is apparent that the area of the display panel 10 where the touch signal lines 15 can be arranged is limited, so the larger the number of touch signal lines 15, the more difficult the display panel 10 is to be manufactured. In the embodiment shown in FIG. 5A to FIG. 5D, the plurality of first through holes 130 corresponding to the same first type touch electrode block 13 are aligned in the first straight line 133, and the first straight line 133 is parallel to the column direction of the array, so each first type touch electrode block 13 corresponds to only one touch signal line 15, the touch signal line 15 is coincident with the first straight line 133, and the number of the touch signal lines 15 is reduced, thereby reducing the difficulty of manufacturing the display panel.

As shown in FIG. 5A, on the basis of the foregoing technical solutions, each of the second type touch electrode blocks 14 corresponds to a second straight line 143, the plurality of second through holes 140 corresponding to the same second type touch electrode block 14 are aligned in the second straight line 143, and the second straight line 143 is parallel to the column direction of the array. Similarly, with the configuration in which the plurality of second through holes 140 corresponding to the same second type touch electrode block 14 are aligned in the second straight line 143 and the second straight line 143 is parallel to the column direction of the array, each second type touch electrode block 14 is connected to only one touch signal line 15, and the touch signal line 15 is coincident with the second straight line 143, further reducing the number of the touch signal lines 15 and reducing the difficulty of manufacturing the display panel.

As shown in FIG. 5A, it should be noted that, if the plurality of first through holes 130 connected to the same first type touch electrode block 13 are aligned in the first straight line 133, the first distance of the first type touch electrode block 13 is equal to the distance between the first straight line 133 of the first type touch electrode block 13 and the edge of the display panel 10 closest to the first type touch electrode block 13. For example, the first distance a of the first type touch electrode block 13 at the intersection of row 1 and column 1 is equal to the distance between the first straight line 133 and the left edge 121. Similarly, if the plurality of second through holes 140 connected to the same second type touch electrode block 14 are aligned in the second straight line 143, the second distance of the second type touch electrode block 14 is equal to the distance between the second straight line 143 of the second type touch electrode block 14 and the edge of the display panel 10 closest to the second type touch electrode block 14. For example, the second distance b of the second type touch electrode block 14 at the intersection of the row 2 and the column 1 is equal to the distance between the second straight line 143 and the left edge 121.

Figure 6:
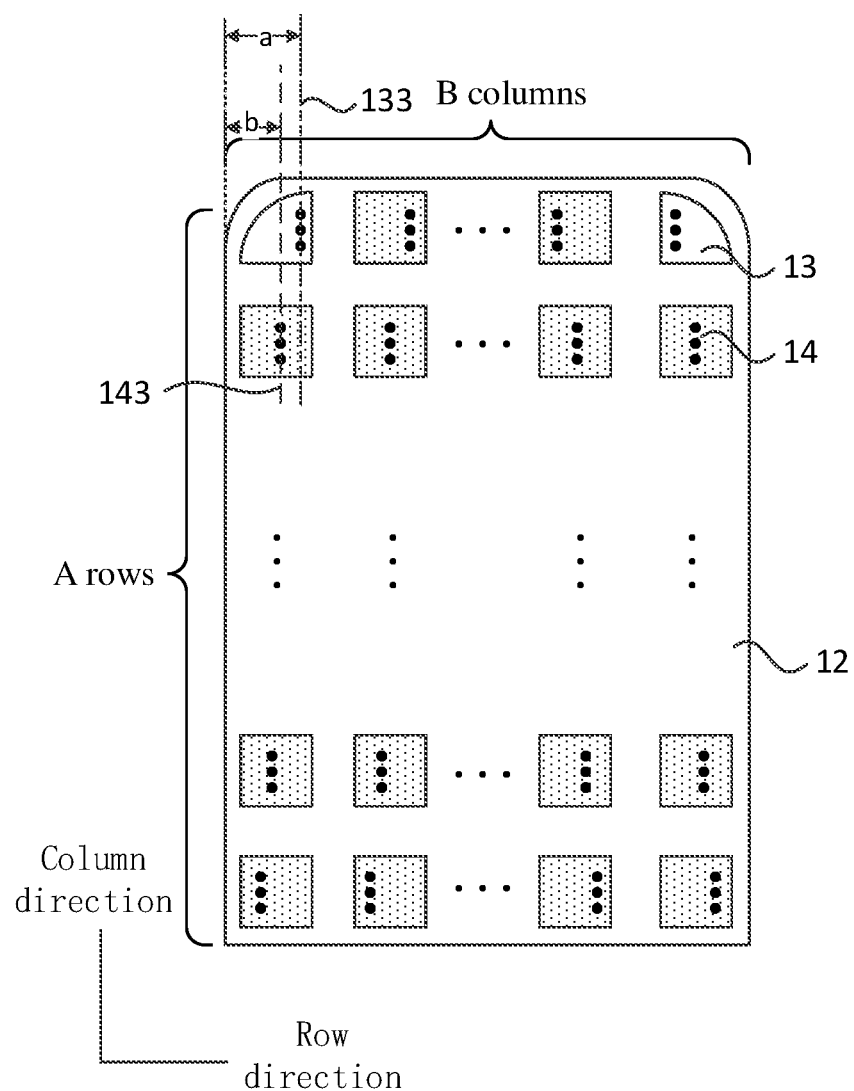
FIG. 6 is a structure diagram of another display panel according to an embodiment of the present disclosure.

FIG. 6 is a structure diagram of another display panel according to an embodiment of the present disclosure. As shown in FIG. 6, in the display panel 10, the at least one first type touch electrode block 13 and the at least one second type touch electrode block 14 are arranged together to form an array of A rows and B columns, where both A and B are positive integers, and A≥2, B≥2. The first type touch electrode block is located in at least one of the following positions: the intersection of the row 1 and the column 1, the intersection of the row 1 and the column B, the intersection of the row A and the column 1, and the intersection of the row A and the column B of the array, so as to adapt the special-shaped edge of the display panel 10, such as a rounded corner, a cut angle or a notch. Exemplarily, in FIG. 6, both the top left corner and the top right corner of the display panel 10 are rounded corners, and the first type touch electrode blocks 13 are respectively arranged at the intersection of the row 1 and the column 1 and the intersection of the row 1 and the column B.

On the basis of the foregoing embodiments, as shown in FIG. 6, the display panel 10 may be configured as follows. In a column containing the first type touch electrode block 13, the first distance a of the first type touch electrode block 13 is larger than the second distance b of an adjacent second type touch electrode block 14 in this column Exemplarily, in the column 1, the first distance a of the first type touch electrode block 13 located at the intersection of the row 1 and the column 1 is larger than the second distance b of the second type touch electrode block 14 located at the intersection of the row 2 and the column 1 With the above arrangement of the first type touch electrode block 13 and the second type touch electrode block 14, the connection resistance between the first type touch electrode block 13 and the touch signal line is equal to or approaches to the connection resistance between the second type touch electrode block 14 and the touch signal line, thereby improving the overall touch control performance and the display effect of the display panel 10.

On the basis of the foregoing embodiments, as shown in FIG. 6, the display panel 10 may be configured as follows. In a column containing the first type touch electrode block 13, the vertical projection of the first straight line of the first type touch electrode blocks 13 on the base substrate 12 and vertical projections of the second straight lines of the second type touch electrode blocks 14 on the base substrate 12 do not overlap each other. With such arrangement, the vertical projections of the touch signal lines electrically connected to the first type touch electrode blocks 13 and the vertical projections of the touch signal lines electrically connected to the second type touch electrode blocks 14 on the base substrate 12 do not overlap each other. On the basis of this, the touch signal lines electrically connected to the first type touch electrode blocks 13 and the touch signal lines electrically connected to the second type touch electrode blocks 14 can be arranged in the same metal film, that is, the touch signal lines electrically connected to the first type touch electrode blocks 13 and the touch signal lines electrically connected to the second type touch electrode blocks 14 are formed in the same manufacturing step, which is conducive to simplifying the manufacturing process and promoting the lightening and thinning of the display panel 10.

Figure 7:
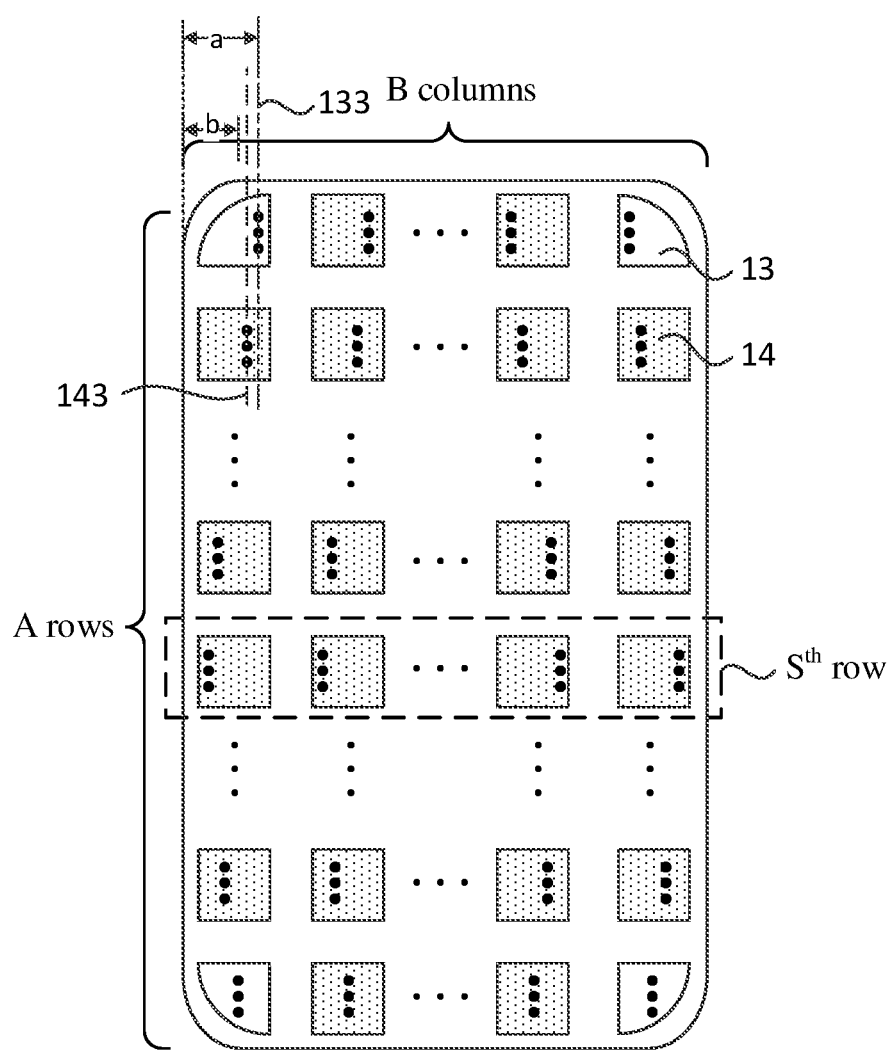
FIG. 7 is a structure diagram of another display panel according to an embodiment of the present disclosure.

On the basis of the foregoing embodiments, the display panel 10 may have various shapes. FIG. 7 is a structure diagram of another display panel according to an embodiment of the present disclosure. As shown in FIG. 7, four corners of the display panel 10 are rounded corners. In the display panel 10, the first type touch electrode blocks 13 are located at the intersection of the row 1 and the column 1, the intersection of the row 1 and the column B, the intersection of the row A and the column 1, and the intersection of the row A and the column B of the array respectively. In the column 1 or the column B, along the column direction, the second distances of the second type touch electrode blocks 14 from the row 2 to the row S decrease sequentially, and the second distances of the second type touch electrode blocks 14 from the row S to the row A-1 increase sequentially, where 1<S<A, A≥3, B≥3. The essence of such arrangement of the display panel 10 is that, in the column 1 or column B, the second distances b of all the second type touch electrode blocks 14 are smaller than the first distance a of the first type touch electrode block 13. In other words, each first through hole 130 connected to the first type touch electrode block 13 is located as far as possible away from the special-shaped edge, such that the number of the first through holes 130 via which the first type touch electrode block 13 is electrically connected to the corresponding touch signal line 15 is equal to or approaches to the number of the second through holes 140 via which the second type touch electrode block 14 is electrically connected to the corresponding touch signal line 15, and accordingly, the connection resistance between the first type touch electrode block 13 and the touch signal line 15 is equal to or approaches to the connection resistance between the second type touch electrode block 14 and the touch signal line 15, thereby improving the overall touch control performance of the display panels 10.

As shown in FIG. 7, on the basis of the foregoing technical solutions, in an alternative embodiment, in a column only containing the second type touch electrode blocks 14 (exemplarily, the column 2 to the column B-1 in FIG. 7), the vertical projections of the second straight lines 143 of the second type touch electrode blocks 14 on the base substrate 12 do not overlap each other, so that it is convenient to realize that the touch signal lines electrically connected to the second type touch electrode blocks 14 are located in the same metal film, that is, the touch signal lines are formed in the same manufacturing step, which is conducive to simplifying the manufacturing process and promoting the lightening and thinning of the display panel 10.

As shown in FIG. 7, in the foregoing embodiments, in any column from the column 2 to the column B-1 of the display panel 10, along the column direction, the second distances of the second type touch electrode blocks 14 from the row 1 to the row S decrease gradually, the second distances of the second type touch electrode blocks 14 increase gradually from the row S to the row A, and $1<S<A$, $A\geq 3$, $B\geq 3$. This arrangement may regularize the arrangement of the first through holes 130 and the second through holes 140 of the display panel 10, so as to prevent abnormal textures in the display process and improve the display effect of the display panel.

Figure 8:
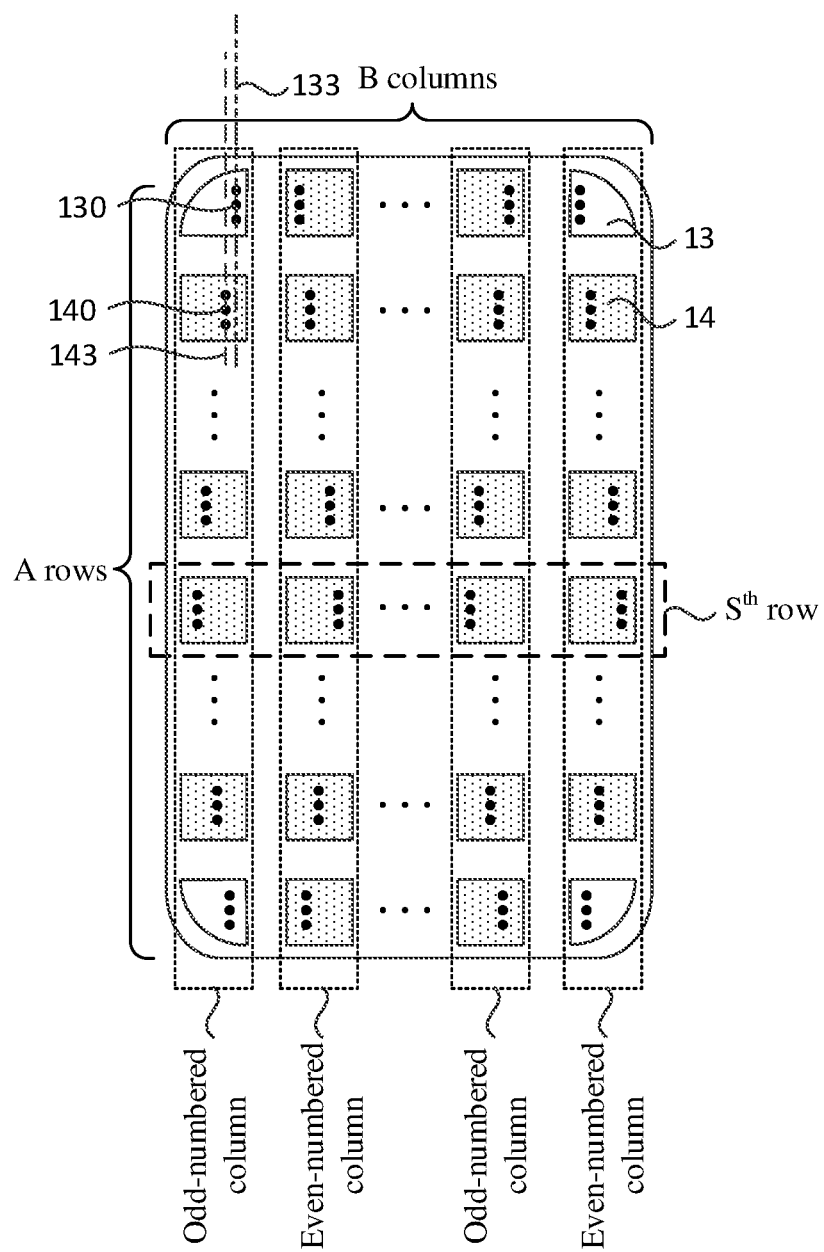
FIG. 8 is a structure diagram of another display panel according to an embodiment of the present disclosure.

FIG. 8 is a structure diagram of another display panel according to an embodiment of the present disclosure, and four corners of the display panel 10 are rounded corners. As shown in FIG. 8, in the display panel 10, B is an even number. In the odd-numbered row within a range from the column 2 to the column B-1, along the column direction, the second distances of the second type touch electrode blocks 14 decrease gradually from the row 1 to the row S, the second distances of the second type touch electrode blocks 14 increase gradually from the row S to the row A. In the even-numbered row within a range from the column 2 to the column B-1, along the column direction, different from the configuration in the odd-numbered row, the second distances of the second type touch electrode blocks 14 increase gradually from the row 1 to the row S, the second distances of the second type touch electrode blocks 14 decrease gradually from the row S to the row A, and $1<S<A$, $A\geq 3$, $B\geq 3$. The arrangement of the display panel 10 may regularize the arrangement of the first through holes 130 and the second through holes 140 of the display panel 10, so as to prevent the abnormal textures in the display process and improve the display effect of the display panel.

Figure 9:
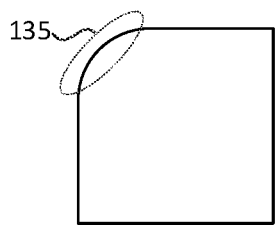
FIG. 9 is a structure diagram of a first type touch electrode block according to an embodiment of the present disclosure.
Figure 10:
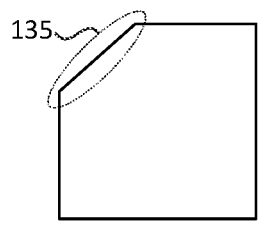
FIG. 10 is a structure diagram of another first type touch electrode block according to an embodiment of the present disclosure.
Figure 11:
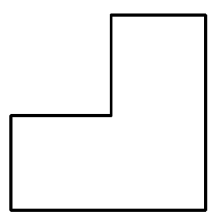
FIG. 11 is a structure diagram of another first type touch electrode block according to an embodiment of the present disclosure.

In the foregoing embodiments, the shape of the first type touch electrode block is a fan, which is merely a specific example of the present disclosure and does not intend to limit the present disclosure. In practice, the first type touch electrode block 13 may be in other shapes. FIG. 9 to FIG. 11 show structures of three first type touch electrode blocks provided in the embodiment of the present disclosure. The shape of the first type touch electrode block shown in FIG. 9 is a quadrangle with a corner 135 being rounded. The shape of the first type touch electrode block shown in FIG. 10 is a quadrangle with a corner 135 being cut. The shape of the first type touch electrode block shown in FIG. 11 is a step. In addition, the shape of the first type touch electrode block 13 may be a triangle or other shapes to adapt to the special-shaped edge of the partial edge of the display panel 10, such as the rounded corner, the cut corner, the notch and the like.

Figure 12A:
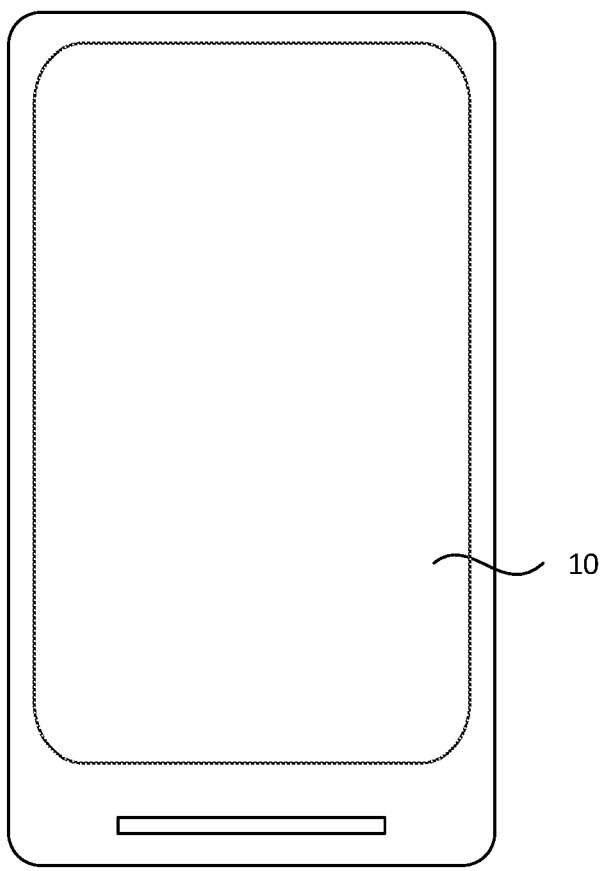
FIG. 12A is structure diagram of a display device according to an embodiment of the present disclosure.
Figure 12B:
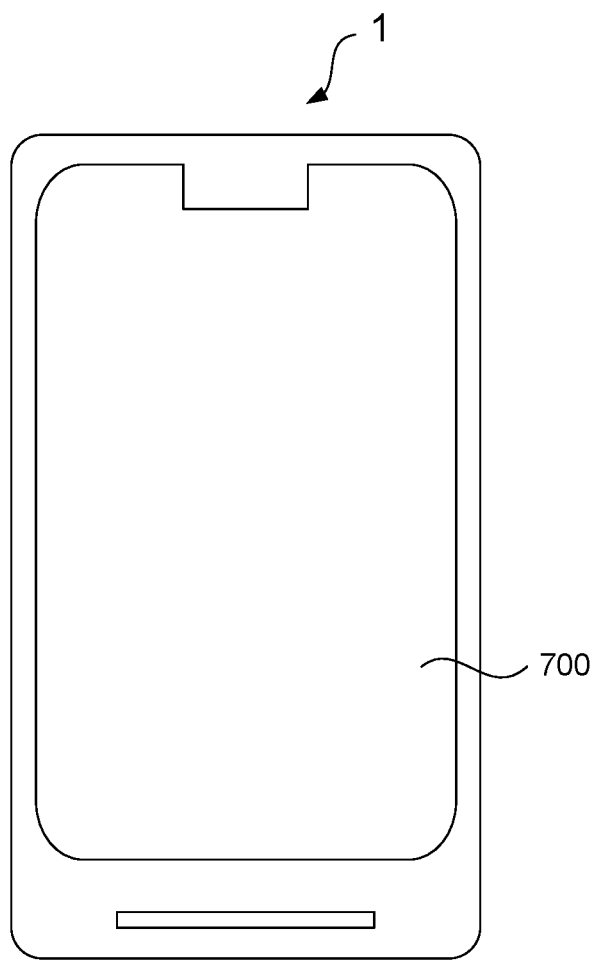
FIG. 12B is structure diagram of another display device according to an embodiment of the present disclosure.

The present disclosure further provides a display device. FIG. 12A is a structure diagram of the display device according to an embodiment of the present disclosure. As shown in FIG. 12A, the display device 1 includes the display panel 10 according to any embodiments of the present disclosure, and the display region of the display panel 10 has four rounded corners. FIG. 12B is a structure diagram of another display device. The display region of the display panel 10 of the display device 1 has a notch and four rounded corners.

According to the technical solution provided by the present disclosure, in a column containing the first type touch electrode block, the second distance of at least one second type touch electrode block in this column is smaller than the first distance of the first type touch electrode block, such that the number of the first through holes via which the first type touch electrode block is electrically connected to one or more touch signal lines is equal to or approaches to the number of the second through holes via which the second type touch electrode block is electrically connected to one or more touch signal lines. With such arrangement, the connection resistance between the first type touch electrode block and the touch signal line is equal to or approaches to the connection resistance between the second type touch electrode block and the touch signal line, thereby improving the touch control performance near the special-shaped edge of the display panel and further improving the overall touch control performance of the display panels.

It should be noted that the above contents are merely exemplary embodiments of the present disclosure and technical principles thereof. It should be understood for those skilled in the art that the present disclosure is not limited to specific embodiments described herein. For those skilled in the art, the present disclosure can be subject to various apparent variations, readjustments and substitutions without departing from a protection scope of the present disclosure. Therefore, although the present disclosure is described in detail through above embodiments, the present disclosure is not only limited to above embodiments. The present disclosure can also include more other equivalent embodiments without deviating from conceptions of the present disclosure. A scope of the present disclosure is determined by a scope of attached claims.

What is claimed is:
1. A display panel, comprising:
a base substrate;
a first layer comprising at least one first type touch electrode block and at least one second type touch electrode block;
a plurality of scanning lines and a plurality of data lines;
a second layer comprising a plurality of touch signal lines; and
an insulation layer between the first layer and the second layer,
wherein the at least one first type touch electrode block is different from the least one second type touch electrode block in shape, the shape of each of the at least one first type touch electrode block is not a rectangle, the at least one first type touch electrode block and the at least one second type touch electrode block are arranged together in an array, wherein the array has A rows and B columns, both A and B are positive integers, and $A\geq 3$, $B\geq 3$, and the at least one first type touch electrode block is located in an intersection of a row 1 and a column 1, an intersection of the row 1 and a column B, an intersection of the row A and the column 1, and an intersection of the row A and the column B;
wherein each of the at least one first type touch electrode block is connected to one or more of the plurality of touch signal lines by a plurality of first through holes running through the insulation layer;
wherein each of the at least one second type touch electrode block is connected to one or more of the plurality of touch signal lines by a plurality of second through holes running through the insulation layer;

wherein the plurality of scanning lines intersect the plurality of data lines; a column direction of the array is parallel to an extending direction of the plurality of data lines, and a row direction of the array is parallel to an extending direction of the plurality of scanning lines;

wherein a minimum one of distances between an edge of the display panel closest to one of the at least one first type touch electrode block and the plurality of first through holes connected to the one of the at least one first type touch electrode block is a first distance of the one of the at least one first type touch electrode block; a minimum one of distances between an edge of the display panel closest to one of the at least one second type touch electrode block and the plurality of second through holes connected to the one of the at least one second type touch electrode block is a second distance of the one of the at least one second type touch electrode block; and wherein in a column of the array containing the one of the at least one first type touch electrode block, the second distance of the one of the at least one second type touch electrode block in the column is smaller than the first distance of the one of the at least one first type touch electrode block;

wherein the each of the at least one first type touch electrode block corresponds to a first straight line, and the plurality of first though holes connected to a same first type touch electrode block are aligned in the first straight line; and the first straight line is parallel to the column direction of the array;

wherein the each of the at least one second type touch electrode block corresponds to a second straight line, and the plurality of second through holes connected to a same second type touch electrode block are aligned in the second straight line; and the second straight line is parallel to the column direction of the array;

wherein in a column containing first type touch electrodes and second type touch electrodes, vertical projections of first straight lines on the base substrate do not overlap vertical projections of second straight lines on the base substrate, the vertical projections of the first straight lines on the base substrate do not overlap each other, and the vertical projections of the second straight lines on the base substrate do not overlap each other;

wherein in the column 1 or column B, along the column direction, second distances of second type touch electrode blocks from a row 2 to a row S decrease sequentially, second distances of second type touch electrode blocks from the row S to a row A-1 increase sequentially, and 1<S<A.

2. The display panel according to claim 1, wherein each of the at least one first type touch electrode block is connected to a same number of first through holes;

each of the at least one second type touch electrode block is connected to a same number of second through holes; and the number of the first through holes connected to one first type touch electrode block is equal to the number of the second through holes connected to one second type touch electrode block.

3. The display panel according to claim 1, wherein the first distance of the one of the at least one first type touch electrode block is greater than the second distance of the one of the at least one second type touch electrode block that is arranged in a same column as the one of the at least one first type touch electrode block and is adjacent to the one of the at least one type touch electrode block.

4. The display panel according to claim 1, wherein the shape of the each of the at least one first type touch electrode block is a rectangular with a rounded corner, a quadrangle with a corner being cut, a fan, a step or a triangle.

5. The display panel according to claim 1, wherein an edge of the each of the at least one first type touch electrode block is an arc.

6. The display panel according to claim 1, wherein at least one of the at least one first type touch electrode block and at least one of the at least one second type touch electrode block are reused as common electrodes.

7. A display device, comprising a display panel, wherein the display panel comprises:

a base substrate; a first layer comprising at least one first type touch electrode block and at least one second type touch electrode block;

a plurality of scanning lines and a plurality of data lines;

a second layer comprising a plurality of touch signal lines; and an insulation layer between the first layer and the second layer, wherein the at least one first type touch electrode block is different from the least one second type touch electrode block in shape, the shape of each of the at least one first type touch electrode block is not a rectangle, the at least one first type touch electrode block and the at least one second type touch electrode block are arranged together in an array, wherein the array has A rows and B columns, both A and B are positive integers, and A≥3, B≥3, and the at least one first type touch electrode block is located in an intersection of a row 1 and a column 1, an intersection of the row 1 and a column B, an intersection of the row A and the column 1, and an intersection of the row A and the column B;

wherein each of the at least one first type touch electrode block is connected to one or more of the plurality of touch signal lines by a plurality of first through holes running through the insulation layer;

wherein each of the at least one second type touch electrode block is connected to one or more of the plurality of touch signal lines by a plurality of second through holes running through the insulation layer;

wherein the plurality of scanning lines intersect the plurality of data lines; a column direction of the array is parallel to an extending direction of the plurality of data lines, and a row direction of the array is parallel to an extending direction of the plurality of scanning lines;

wherein a minimum one of distances between an edge of the display panel closest to one of the at least one first type touch electrode block and the plurality of first through holes connected to the one of the at least one first type touch electrode block is a first distance of the one of the at least one first type touch electrode block; a minimum one of distances between an edge of the display panel closest to one of the at least one second type touch electrode block and the plurality of second through holes connected to the one of the at least one second type touch electrode block is a second distance of the one of the at least one second type touch electrode block; and wherein in a column of the array containing the one of the at least one first type touch electrode block, the second distance of the one of the at least one second type touch electrode block in the column is smaller than the first distance of the one of the at least one first type touch electrode block;

wherein the each of the at least one first type touch electrode block corresponds to a first straight line, and the plurality of first through holes connected to a same first type touch electrode block are aligned in the first straight line; and the first straight line is parallel to the column direction of the array;

wherein the each of the at least one second type touch electrode block corresponds to a second straight line, and the plurality of second through holes connected to a same second type touch electrode block are aligned in the second straight line; and the second straight line is parallel to the column direction of the array;

wherein in a column containing first type touch electrodes and second type touch electrodes, vertical projections of first straight lines on the base substrate do not overlap vertical projections of second straight lines on the base substrate, the vertical projections of the first straight lines on the base substrate do not overlap each other, and the vertical projections of the second straight lines on the base substrate do not overlap each other;

wherein in the column 1 or column B, along the column direction, second distances of second type touch electrode blocks from a row 2 to a row S decrease sequentially, second distances of second type touch electrode blocks from the row S to a row A-1 increase sequentially, and 1<S<A.

8. A display panel, comprising:
a base substrate;
a plurality of touch signal lines arranged in a first layer on the base substrate, wherein the plurality of touch signal lines are arranged in a first direction and each extend in a second direction;
a plurality of touch electrode blocks arranged in a second layer on the base substrate, wherein the plurality of touch electrode blocks are arranged in A rows and B columns and insulated with each other, wherein both A and B are positive integers, and A≥3, B≥3; and
an insulation layer between the first layer and the second layer, wherein each of the plurality of touch electrode blocks is electrically connected to a respective one of the plurality of touch signal lines by a plurality of through holes running through the insulation layer,
wherein the plurality of touch electrode blocks comprise at least one non-rectangular first touch electrode block and at least one second touch electrode block, the at least one first touch electrode block is different from the at least one second touch electrode block in shape, wherein the at least one first type touch electrode block is located in an intersection, of a row 1 and a column 1 an intersection of a row 1 and a column B, an intersection of a row A and a column 1, and an intersection of a row A and a column B;
wherein a distance between the touch signal line to which the second touch electrode block is connected and an edge of the display panel closest to the column where the at least one first touch electrode block and the at least one second touch electrode block are arranged is a second distance, a distance between the touch signal line to which the first touch electrode block is connected and the edge of the display panel closest to the column where the first touch electrode block and the second touch electrode block are arranged is a first distance, the second distance is smaller than the first distance;

wherein in the column 1 or column B, aloe column direction, second distances of second type touch electrode blocks from a row 2 to a row S decrease sequentially, second distances of second type touch electrode blocks from a row S to a row A-1 increase sequentially, and 1<S<A.

9. The display panel according to claim 8, wherein an edge of the first touch electrode block is an arc.

10. The display panel according to claim 8, wherein the plurality of touch electrode blocks are arranged in a display region of the display panel, the display region has a notch and/or a rounded corner.

11. The display panel according to claim 10, wherein the first touch electrode block is closer to the notch or the rounded corner than the second touch electrode block.

12. The display panel according to claim 10, wherein the display region has a midline parallel to the column where the first touch electrode block and the second touch electrode block are arranged, the touch signal line to which the first touch electrode block is connected is closer to the midline than the touch signal line to which the second touch electrode block is connected.

13. A display panel, comprising:
a base substrate;
a first layer comprising at least one first type touch electrode block and at least one second type touch electrode block;
a plurality of scanning lines and a plurality of data lines;
a second layer comprising a plurality of touch signal lines; and
an insulation layer between the first layer and the second layer,
wherein the at least one first type touch electrode block is different from the least one second type touch electrode block in shape, the shape of each of the at least one first type touch electrode block is not a rectangle, the at least one first type touch electrode block and the at least one second type touch electrode block are arranged together in an array, wherein the array has A rows and B columns, both A and B are positive integers, and A≥3, B≥3, and the at least one first type touch electrode block is located in at least one positions: an intersection of a row 1 and a column 1, an intersection of the row 1 and a column B, an intersection of the row A and the column 1, and an intersection of the row A and the column B;
wherein each of the at least one first type touch electrode block is connected to one or more of the plurality of touch signal lines by a plurality of first through holes running through the insulation layer;
wherein each of the at least one second type touch electrode block is connected to one or more of the plurality of touch signal lines by a plurality of second through holes running through the insulation layer;
wherein the plurality of scanning lines intersect the plurality of data lines;
a column direction of the array is parallel to an extending direction of the plurality of data lines, and a row direction of the array is parallel to an extending direction of the plurality of scanning lines;
wherein a minimum one of distances between an edge of the display panel closest to one of the at least one first type touch electrode block and the plurality of first through holes connected to the one of the at least one first type touch electrode block is a first distance of the one of the at least one first type touch electrode block;
a minimum one of distances between an edge of the display panel closest to one of the at least one second type touch electrode block and the plurality of second through holes connected to the one of the at least one second type touch electrode block is a second distance of the one of the at least one second type touch electrode block; and wherein in a column of the array containing the one of the at least one first type touch electrode block, the second distance of the one of the at least one second type touch electrode block in the column is smaller than the first distance of the one of the at least one first type touch electrode block;

wherein the each of the at least one first type touch electrode block corresponds to a first straight line, and the plurality of first through holes connected to a same first type touch electrode block are aligned in the first straight line; and the first straight line is parallel to the column direction of the array;

wherein the each of the at least one second type touch electrode block corresponds to a second straight line, and the plurality of second through holes connected to a same second type touch electrode block are aligned in the second straight line; and the second straight line is parallel to the column direction of the array;

wherein in a row only containing second type touch electrode blocks, vertical projections of second straight lines, corresponding to the second type touch electrode blocks, on the base substrate do not overlap each other, and in any one of the columns 2 to B-1, along the column direction, second distances of second type touch electrode blocks from the row 1 to the row S decrease sequentially, and second distances of second type touch electrode blocks from the row S to the row A increase sequentially, and 1<S<A.

14. The display panel according to claim 13, wherein each of the at least one first type touch electrode block is connected to a same number of first through holes;

each of the at least one second type touch electrode block is connected to a same number of second through holes; and the number of the first through holes connected to one first type touch electrode block is equal to the number of the second through holes connected to one second type touch electrode block.

15. The display panel according to claim 13, wherein the first distance of the one of the at least one first type touch electrode block is greater than the second distance of the one of the at least one second type touch electrode block that is arranged in a same column as the one of the at least one first type touch electrode block and is adjacent to the one of the at least one first type touch electrode block.

16. The display panel according to claim 13, wherein the shape of the each of the at least one first type touch electrode block is a rectangular with a rounded corner, a quadrangle with a corner being cut, a fan, a step or a triangle.

17. A display panel, comprising:
a base substrate;
a first layer comprising at least one first type touch electrode block and at least one second type touch electrode block;
a plurality of scanning lines and a plurality of data lines;
a second layer comprising a plurality of touch signal lines; and
an insulation layer between the first layer and the second layer, wherein the at least one first type touch electrode block is different from the least one second type touch electrode block in shape, the shape of each of the at least one first type touch electrode block is not a rectangle, the at least one first type touch electrode block and the at least one second type touch electrode block are arranged together in an array, wherein the array has A rows and B columns, both A and B are positive integers, and A≥3, B≥3, and the at least one first type touch electrode block is located in at least one positions: an intersection of a row 1 and a column 1, an intersection of the row 1 and a column B, an intersection of the row A and the column 1, and an intersection of the row A and the column B;

wherein each of the at least one first type touch electrode block is connected to one or more of the plurality of touch signal lines by a plurality of first through holes running through the insulation layer;

wherein each of the at least one second type touch electrode block is connected to one or more of the plurality of touch signal lines by a plurality of second through holes running through the insulation layer;

wherein the plurality of scanning lines intersect the plurality of data lines;

a column direction of the array is parallel to an extending direction of the plurality of data lines, and a row direction of the array is parallel to an extending direction of the plurality of scanning lines;

wherein a minimum one of distances between an edge of the display panel closest to one of the at least one first type touch electrode block and the plurality of first through holes connected to the one of the at least one first type touch electrode block is a first distance of the one of the at least one first type touch electrode block; a minimum one of distances between an edge of the display panel closest to one of the at least one second type touch electrode block and the plurality of second through holes connected to the one of the at least one second type touch electrode block is a second distance of the second type touch electrode block; and wherein in a column of the array containing the one of the at least one first type touch electrode block, the second distance of the one of the at least one second type touch electrode block in the column is smaller than the first distance of the one of the at least one first type touch electrode block;

wherein the each of the at least one first type touch electrode block corresponds to a first straight line, and the plurality of first through holes connected to a same first type touch electrode block are aligned in the first straight line; and the first straight line is parallel to the column direction of the array;

wherein the each of the at least one second type touch electrode block corresponds to a second straight line, and the plurality of second through holes connected to the same second type touch electrode block are aligned in the second straight line; and the second straight line is parallel to the column direction of the array;

wherein in a row only containing the second type touch electrode blocks, vertical projections of second straight lines, corresponding to the second type touch electrode blocks, on the base substrate do not overlap each other, and B is even; in each odd-numbered column between a column 2 and a column B-1, along the column direction, second distances of second type touch electrode blocks from the row 1 to the row S decrease sequentially, second distances of second type touch electrode blocks from the row S to the row A increase sequentially; and in each even-numbered column between a column 2 to a column B-1, along the even row, along the column direction, second distances of second type touch electrode blocks from the row 1 to the row S increase sequentially, second distances of second type touch electrode blocks from the row S to the row A decrease sequentially, and 1<S<A.

18. The display panel according to claim 17, wherein each of the at least one first type touch electrode block is connected to a same number of first through holes;
each of the at least one second type touch electrode block is connected to a same number of second through holes; and
the number of the first through holes connected to one first type touch electrode block is equal to the number of the second through holes connected to one second type touch electrode block.

19. The display panel according to claim 17, wherein the first distance of the one of the at least one first type touch electrode block is greater than the second distance of the one of the at least one second type touch electrode block that is arranged in a same column as the one of the at least one first type touch electrode block and is adjacent to the one of the at least one first type touch electrode block.

20. A display panel, comprising:
a base substrate;
a plurality of touch signal lines arranged in a first layer on the base substrate, wherein the plurality of touch signal lines are arranged in a first direction and each extend in a second direction;
a plurality of touch electrode blocks arranged in a second layer on the base substrate, wherein the plurality of touch electrode blocks are arranged in A rows and B columns and insulated with each other, wherein both A and B are positive integers, and A≥3, B≥3; and
an insulation layer between the first layer and the second layer,
wherein each of the plurality of touch electrode blocks is electrically connected to a respective one of the plurality of touch signal lines by a plurality of through holes running through the insulation layer,
wherein the plurality of touch electrode blocks comprise at least one non-rectangular first touch electrode block and at least one second touch electrode block, the at least one first touch electrode block is different from the at least one second touch electrode block in shape, wherein the at least one first type touch electrode block is located in an intersection of a row 1 and a column 1, an intersection of a row 1 and a column B, an intersection of a row A and a column 1, and an intersection of a row A and a column B;
wherein a distance between the touch signal line to which the second touch electrode block is connected, and an edge of the display panel closest to the column where the at least one first touch electrode block and the at least one second touch electrode block are arranged is a second distance, a distance between the touch signal line to which the first touch electrode block is connected and the edge of the display panel closest to the column where the first touch electrode block and the second touch electrode block are arranged is a first distance, the second distance is smaller than the first distance;
wherein in a row only containing second type touch electrode blocks, vertical projections of second straight lines, corresponding to the second type touch electrode blocks, on the base substrate do not overlap each other, and in any one of the columns 2 to B-1, along the column direction, second distances of second type touch electrode blocks from the row 1 to the row S decrease sequentially, and second distances of second type touch electrode blocks from the row S to the row A increase sequentially, and 1<S<A.

21. A display panel, comprising:
a base substrate;
a plurality of touch signal lines arranged in a first layer on the base substrate, wherein the plurality of touch signal lines are arranged in a first direction and each extend in a second direction;
a plurality of touch electrode blocks arranged in a second layer on the base substrate, wherein the plurality of touch electrode blocks are arranged in A rows and B columns and insulated with each other, wherein both A and B are positive integers, and A≥3, B≥3; and
an insulation layer between the first layer and the second layer,
wherein each of the plurality of touch electrode blocks is electrically connected to a respective one of the plurality of touch signal lines by a plurality of through holes running through the insulation layer,
wherein the plurality of touch electrode blocks comprise at least one non-rectangular first touch electrode block and at least one second touch electrode block, the at least one first touch electrode block is different from the at least one second touch electrode block in shape, wherein the at least one first type touch electrode block is located in an intersection of a row 1 and a column 1, an intersection of a row 1 and a column B, an intersection of a row A and a column 1, and an intersection of a row A and a column B;
wherein a distance between the touch signal line to which the second touch electrode block is connected and an edge of the display panel closest to the column where the at least one first touch electrode block and the at least, one second touch electrode block arc arranged is a second distance, a distance between the touch signal line to which the first touch electrode block is connected and the edge of the display panel closest to the column where the first touch electrode block and the second touch electrode block are arranged is a first distance, the second distance is smaller than the first distance;
wherein in a row only containing the second type touch electrode blocks, vertical projections of second straight lines, corresponding to the second type touch electrode blocks, on the base substrate do not overlap each other, and B is even; in each odd-numbered column between a column 2 and a column B-1, along the column direction, second distances of second type touch electrode blocks from the row 1 to the row S decrease sequentially, second distances of second type touch electrode blocks from the row S to the row A increase sequentially; and in each even-numbered column between a column 2 to a column B-1, along the even row, along the column direction, second distances of second type touch electrode blocks from the row 1 to the row S increase sequentially, second distances of second type touch electrode blocks from the row S to the row A decrease sequentially, and 1<S<A.

* * * * *